United States Patent [19]
Colton

[11] Patent Number: 5,645,340
[45] Date of Patent: Jul. 8, 1997

[54] FLASHLIGHT REPLACEMENT FOR VEHICLE ASHTRAY

[76] Inventor: Orren L. Colton, P.O. Box 5010, Huntington Beach, Calif. 92615-5010

[21] Appl. No.: 492,231

[22] Filed: Jun. 19, 1995

[51] Int. Cl.⁶ ........................................ B60Q 3/06
[52] U.S. Cl. .............. 362/80; 362/83.3; 362/191; 362/183; 296/379
[58] Field of Search ............. 362/80, 83.3, 154, 362/190, 191, 183; 296/37.9, 37.8

[56] References Cited

U.S. PATENT DOCUMENTS

| | | |
|---|---|---|
| D. 295,450 | 4/1988 | Iscovelli . |
| 3,967,274 | 6/1976 | Howell . |
| 4,286,742 | 9/1981 | Pellegrino . |
| 4,713,735 | 12/1987 | Hiltman . |
| 4,847,738 | 7/1989 | Nehl . |
| 4,953,772 | 9/1990 | Phifer . |
| 5,077,643 | 12/1991 | Leach . |
| 5,144,963 | 9/1992 | Dabringhaus et al. . |

*Primary Examiner*—Ira Lazarus
*Assistant Examiner*—Thomas M. Sember
*Attorney, Agent, or Firm*—James G. O'Neill

[57] ABSTRACT

A flashlight assembly for use in a vehicle to replace an ashtray. The flashlight includes a front handle portion conformable to the opening of an ashtray and when inserted into the ashtray opening, in place of the ashtray, blends in with the vehicle console or dashboard. The flashlight is slidably or pivotably mounted in the ashtray opening, and is easily removable from the ashtray opening, for use by an operator or others, as needed. A charging contact may be added to the ashtray opening for recharging a rechargeable flashlight, or batteries held within the flashlight, when the flashlight is inserted fully into the ashtray opening contacting the charging contact.

20 Claims, 1 Drawing Sheet

U.S. Patent  Jul. 8, 1997  5,645,340
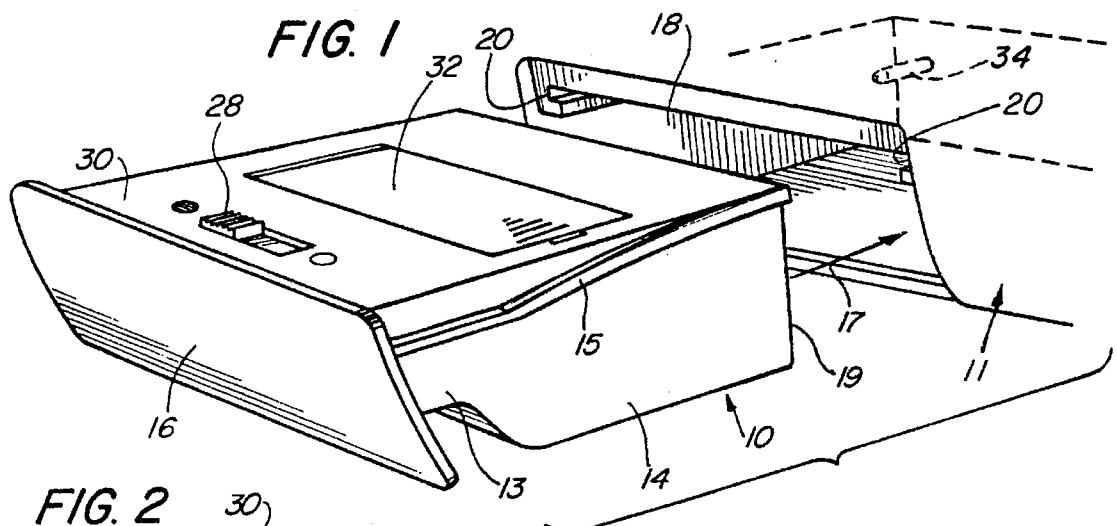
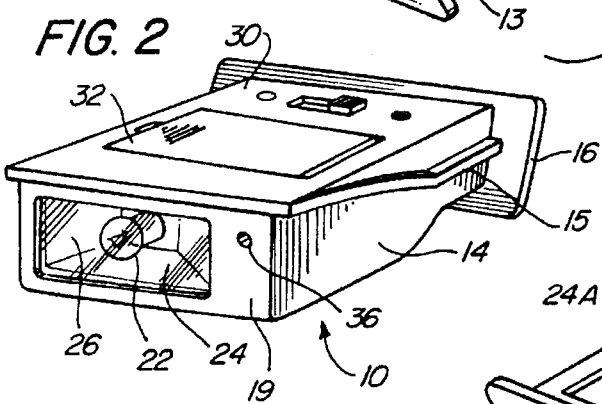
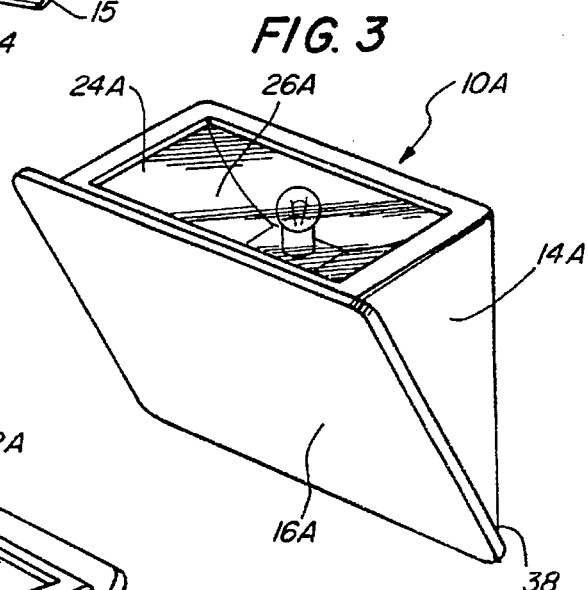
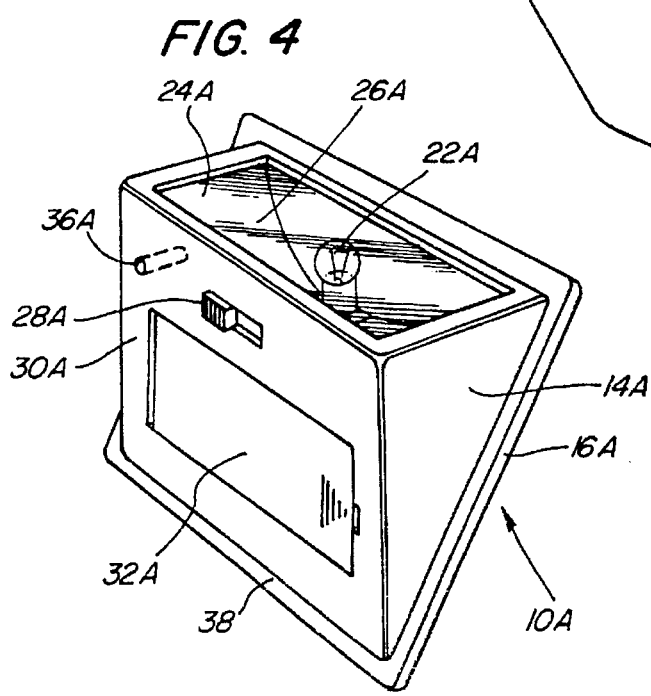

FLASHLIGHT REPLACEMENT FOR VEHICLE ASHTRAY

BACKGROUND OF THE INVENTION

1. Field of the Invention

This invention relates generally to flashlights, and more particularly to an improved flashlight assembly for easy insertion, storage and removable from an ashtray opening in a vehicle.

2. Description of Related Art

As is well known, the need for a flashlight frequently arises when one is traveling in a vehicle. Therefore, many vehicle operators carry a flashlight someplace in the vehicle, such as in a glove compartment, or in a trunk. Such flashlights take up space and are often hard to reach or forgotten and, in many instances when attempted to be used, it is found that the batteries are dead.

One attempt to overcome this problem of having a flashlight readily available is shown in U.S. Pat. No. 5,077,643 to Leach, which discloses combination courtesy lights and flashlights which are slidably mounted in receptacles having there own power supplies added to the door or roof of the vehicle. This patent, however, requires the owner or user of the vehicle to go to the trouble and expense of adding the receptacle and power supply to the vehicle in a convenient location, that might interfere with other items in the doors or roof of the vehicle.

However, with present day interest in health and the fear of tobacco smoke in enclosed places, the acceptance of smoking in vehicles has been declining sharply. Therefore, the use of ashtrays mounted in vehicles has shown a sharp drop off in usage. Increasingly vehicle owners are gluing ashtrays in the closed position, removing the ashtrays from the vehicle, or using the ashtrays to hold other items, such as, for example, change. Vehicle manufacturers continue to market vehicles with ashtrays therein, and these ashtrays and/or openings for holding such ashtrays as well as the ashtrays in existing vehicles end up merely taking up space that could be used for other purposes, or are used as set forth above. Therefore, in addition to the above set forth actions, many vehicle owners have added additional items to the ashtrays or replaced the ashtray, in an effort to utilize the ashtray and or its holding space.

A known device for use in a vehicle ashtray is shown in U.S. Pat. No. 4,953,772 to Phifer, which discloses drink holders which may be pivotably or slidably mounted in an ashtray or in an ashtray holding socket of vehicle. The ashtray of the vehicle may be removed from the vehicle and one of the drink holders of the Phifer patent mechanically inserted therein for movement into and out of the ashtray socket, or the ashtray of the vehicle may be modified to hold one or more drink holding rings, which mechanically pivot away from the ashtray. In one of the embodiments disclosed in this patent, the ashtray may still function as a conventional ashtray.

Various other U.S. patents such as U.S. Pat. No. 5,144,963 to Dabringhaus et al., U.S. Pat. No. 4,847,738 to Nehl, U.S. Pat. No. 4,713,735 to Hiltman, U.S. Pat. No. 4,286,742 to Pellegrino, U.S. Pat. No. 3,967,274 to Howell, and Des Pat. 295,450 to Iscovelli disclose ashtrays with flashlights, means for replacing or modifying vehicle ashtrays, or the mechanical mounting of lights in openings, to solve known problems, or to modify existing structures, as specifically indicated therein. However, none of these patents, disclose a removable flashlight which is formed in substantially the same shape as an ashtray, so as to cooperate with and be easily inserted into and removed from the existing ashtray opening, or socket of a vehicle. There, therefore, exists a need for a simple, low-cost and easy to manufacture, install and use flashlight means or system, useful in many situations, but which is particularly useful for installation in an ashtray opening of a vehicle, and which has the shape of the ashtray which is removed from the opening, so as to blend into or be integrated with a vehicle dashboard. Such a flashlight provides the illusion that the ashtray is still in position, when inserted in the ashtray socket, but is readily accessible and easily removed and used when needed.

SUMMARY OF THE INVENTION

Accordingly, it is a general object of the present invention to provide an improved flashlight assembly. It is a particular object of the present invention to provide an improved flashlight assembly which is easy to manufacture, assemble, install and use. It is a still more particular object of the present invention to provide a flashlight assembly which is readily added to existing ashtrays, or openings or sockets therefor in a vehicle. It is yet a more particular object of the present invention to provide a flashlight assembly having a shape, including a holding handle, to enable the flashlight to be easily mounted in and/or removed from a vehicle ashtray opening. It is a further object of the present invention to provide a flashlight assembly which contains an internal charging mechanism held therein to enable the flashlight to be recharged when secured in position in an ashtray socket. It is yet another object of the present invention to provide an improved flashlight assembly which is capable of being manufactured as original equipment for a vehicle, or in the aftermarket, for use in an existing ashtray socket of a vehicle. And, it is yet a further object of the present invention to provide an improved flashlight assembly which includes integrated slide means for easy insertion into, and removal from, the existing ashtray socket of a vehicle.

In accordance with one aspect of the present invention, there is provided a flashlight assembly that is shaped as an ashtray with a holding handle at one end, a bulb, lens and reflector secured at another end, and an on-off switch secured to a side thereof, in such a manner that the flashlight may be easily inserted and taken out of a holding means for an ashtray in a vehicle, and activated by the user after removal from the ashtray holding means of the vehicle.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is an exploded perspective view of a vehicle ashtray opening with one embodiment of the flashlight assembly of the present invention, shown in a position where it has been removed from or may be easily inserted into position in the ashtray opening;

FIG. 2 is a further perspective view of the flashlight assembly of FIG. 1, looking in the direction of the light portion end and illustrating a lens, light bulb and reflector;

FIG. 3 is a further perspective view of another embodiment of a flashlight assembly of the present invention, looking in the direction of a holding end thereof, for use in a pivoting vehicle ashtray opening; and FIG. 4 is a further perspective of the flashlight assembly of FIG. 3, looking in the direction of the lens, light bulb and reflector end thereof.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to describe an improved flashlight assembly, identified generally at 10, for use in an existing ashtray, or an ashtray opening, recess, or socket 12 in a vehicle console or dashboard, partially shown at 11. For reasons of explanation only, and not by way of limitation, the ashtray openings and flashlight assemblies described and shown herein are of the type normally found in small compact cars, pickup trucks or sports utility vehicles. It is to be understood, of course, that the present invention provides a flashlight means for use in the existing ashtray opening of substantially any vehicle.

Turning now to the drawings, and particularly to FIGS. 1 and 2, one embodiment of the flashlight assembly 10 of the present invention is shown as comprising a plurality of cooperating components or elements, including an elongated body or housing means 14, which may take any desired shape, and which could actually be the existing ashtray with the flashlight components inserted and held therein by securing means, such as Velcro, or the like. The component of the flashlight may be made from any available material that is currently used to make flashlights, such as metal or plastic. The housing 14, as illustrated in FIG. 1 is preferably formed in a substantially rectangular shape, with a reduced neck portion 13, connecting the housing to a handle or front means 16. The housing 14 may also include a slide, track or other guiding means 15, and is preferably dimensioned and sized so as to be of a length, thickness and width that it fits easily and smoothly into, and moves snugly in an existing vehicle ashtray opening, such as the substantially rectangular opening shown at 12. The handle 16 of the housing 14, may also act as a gripping means at the front or a first end of the flashlight 10. This gripping means or handle 16 is preferably dimensioned and sized so as to be easily pulled or pushed, and in most instances, comfortably gripped in the hand of a user. Furthermore, handle 16 is also painted or covered with a material to match or closely resemble the console or dashboard, or the outside of the front or pull handle of the removed manufacturers' ashtray that came with the vehicle, so as to closely blend in with, or match the console dashboard 11.

When the flashlight 10 is to be inserted in a console or dashboard 11, it is held in the position shown in FIG. 1, where it may be easily held in the hand of an average size adult, by the handle 16 for insertion into the opening 12, in the direction of arrow 17, as by sliding a second end 19 of the flashlight into a open front 18, with the guiding means or slides 15 securely held in mating guiding means or tracks 20, formed within the opening 12. The flashlight is preferably pushed into opening 12 until the rear surface of the handle 16 abuts the front face or surround of the open front 18. In this position, the device is not obviously a flashlight, but would be readily available for anyone who knew what it was, and may be easily removed from opening 12 by pulling on the grip/handle 16, in the direction opposite of that shown by arrow 17, until the flashlight was completely removed and ready for use.

As more clearly shown in FIG. 2, the flashlight 10, includes an illuminating or lighting portion on the second end 19. This second end is preferably substantially flat and rectangular, and includes a bulb 22, a lens 24, and a reflector 26, operated by a power means, in a known manner. The flashlight 10 also includes an on-off switch 28, of a type well known to those skilled in the art, preferably positioned closely adjacent the first end and handle 16, on a side 30 of the housing, whereby it may be easily actuated by a finger or thumb of a person gripping the handle 16, to operate the light. Additionally, the housing 14 of flashlight 10 may include a removable cover means 32 on the side 30, for an internal compartment (not shown) to hold batteries or another power source for the light, in a manner well known to those skilled in the art.

As is also shown in FIG. 1, if a rechargeable flashlight or batteries held therein are needed or desired, the ashtray opening 12 may be provided with an electrical contact, or the like 34, attached to a separate charging system, or the electrical system of a vehicle in a known manner, and which cooperates with an electrical contact slot or opening 36 in the end 19, to enable the flashlight or rechargeable batteries held within the internal compartment, beneath the removable cover means 30, to be charged when the flashlight is fully inserted within the opening 12, so as to make contact between contact 34 and contact 36.

A further embodiment of the flashlight assembly of the present invention is shown at 10A in FIGS. 3 and 4 of the drawings. This embodiment is used in a vehicle having a pivoting type ashtray and includes an elongated, substantially V-shaped body or housing 14A, which may be made from any available material that is currently used to make flashlights, such as metal or plastic. The housing 14A includes an enlarged flattened end 19A and a narrow end 38 at the bottom or lower end of the V. The flashlight 10A is inserted and held within the existing opening in a console or dashboard of a vehicle in substantially the same manner as the existing ashtray which has been removed. To accomplish this, the housing 14A may be provided with side holding or pivoting means (not shown), similar or identical to those of the existing ashtray, to removably secure the flashlight within the ashtray opening, in a manner well known to those skilled in the art. The housing 14A includes a front or handle portion 16A extending from above the enlarged end 19A to below the narrow end 38. This front or handle 16A is easily pulled or pushed so as to pivot the flashlight 10A into and out of the ashtray opening in the vehicle. Furthermore, because of the V-shape of the body or housing 14A, the flashlight may be comfortably gripped in the hand of a user between the front 16A and a face or side 30A. The front 16A is also painted or covered with a material to match or closely resemble the front handle of the removed manufacturers' ashtray that came with the vehicle, so as to closely blend in with, or match the console or dashboard.

When the flashlight 10A is to be inserted in the ashtray opening in a vehicle, it is preferably held by a user at the enlarged top portion 19A thereof, and easily inserted into the ashtray opening until it is locked or secured therein, in a known manner. The entire flashlight 10A is then pivoted or rocked into the ashtray opening until the rear edge of the handle 16A abuts the front face or surround of the ashtray opening. Since the exterior of the front face blends with the console, dashboard or other region where it is installed, it will not be obvious to anyone that a flashlight has been inserted and held in the ashtray opening. The flashlight 10A, however, would be readily available for anyone in the vehicle who knew what it was, and may be easily removed from the ashtray opening by pulling on the front handle 16A, to pivot the flashlight open and then removing the flashlight from the ashtray opening, in a manner similar to removing the ashtray.

The flashlight 10A also includes an illuminating or lighting portion on the substantially flattened, enlarged end 19A, which includes a bulb 22A, a lens 24A, and a reflector 26A. The flashlight 10A also includes an on-off switch 28A, preferably positioned closely adjacent the flattened end 19A on the face or side 30A, away from the front handle 16A, whereby it may be actuated by a finger or thumb of a person gripping the flashlight between the front handle 16A and rear face or side 30A toward the narrow end 38 to turn the flashlight on and off. Additionally, the flashlight 10A may include a removable cover means 32A on the side 30A, for an internal compartment to hold batteries or another power source for the light.

As is shown in FIG. 4, if a rechargeable flashlight is needed or desired, a contact slot or opening 36A may be provided in the face or side 30A to enable rechargeable batteries held within the internal compartment, beneath the cover means 32A, to be charged when the flashlight 10A is fully inserted and held in the closed position, contacting a further contact (not shown), similar to contact 34, within the ashtray opening.

As described above, the flashlight assembly of the present invention is mounted in an existing ashtray opening in a vehicle, after the existing ashtray in the dashboard is removed. And, although the flashlight assembly of the present invention may be used to replace the ashtray, it could also be manufactured as original equipment by a vehicle manufacturer, eliminating the ashtray altogether. The flashlight is inserted and held in the ashtray opening of the vehicle so as to be readily available in a convenient and accessible position without requiring that the user leave the vehicle or reach into an inaccessible area of the vehicle. Because the size and coloring of the flashlight have been carefully selected for the vehicle it will conveniently cooperate with the existing ashtray opening and require no adjustments or changes to the vehicle. Furthermore, its coloring will match the dashboard of the vehicle so as to blend with the same and be indistinguishable from an ashtray.

It, thus, can be seen that the flashlight assembly of the present invention provides a flashlight that is interchangeable with vehicle ashtrays by merely inserting it in the existing ashtray openings, or that can be easily installed by a manufacturer at the factory when assembling the vehicle, in place of an ashtray.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What I claim is:

1. A flashlight assembly comprising, in combination:

a substantially elongated housing having a first end and a second end;

said first end of said substantially elongated housing being sized and dimensioned so as to be secured in an ashtray opening in a dashboard of a vehicle;

said first end being substantially rectangular and secured to said substantially elongated housing and having a lighting portion, including a bulb, a lens and a reflector;

said substantially elongated housing including means for releasably capturing said flashlight assembly in said ashtray opening; and said substantially elongated housing including a substantially rectangular front handle portion secured to said substantially elongated housing, away from said first end, for manipulating said flashlight and inserting said first end into, or removing said first end from said ashtray opening.

2. The flashlight assembly of claim 1 wherein said front handle is covered with a material that matches the vehicle interior having the ashtray opening in which it is inserted.

3. The flashlight assembly of claim 1, further including a switch means mounted to a first side of said elongated housing for actuating said lighting portion; and said first side including a removable battery cover means.

4. The flashlight assembly of claim 1 wherein said elongated housing is substantially rectangular in shape for slidable insertion into a substantially rectangular ashtray opening.

5. The flashlight assembly of claim 4, further including a switch means mounted to a first side of said elongated housing for actuating said lighting portion.

6. The flashlight assembly of claim 5, further including a switch means mounted to a first side of said elongated housing for actuating said lighting portion; and said first side including a removable battery cover means.

7. The flashlight assembly of claim 6 wherein said elongated body includes a reduced neck portion connecting the elongated body to said front handle.

8. The flashlight assembly of claim 4, further including a rail means mounted to said elongated housing to enable said elongated housing to be inserted and guided into the proper position in said ashtray opening.

9. The flashlight assembly of claim 8, further including a switch means mounted to a first side of said elongated housing for actuating said lighting portion.

10. The flashlight assembly of claim 9, further including a switch means mounted to a first side of said elongated housing for actuating said lighting portion; and said first side including a removable battery cover means.

11. The flashlight assembly of claim 10 wherein said elongated body includes a reduced neck portion connecting the elongated body to said front handle.

12. The flashlight assembly of claim 1 wherein said elongated housing is substantially V-shaped for insertion into an ashtray opening for pivotable movement.

13. The flashlight assembly of claim 12, further including a switch means mounted to a first side of said elongated housing for actuating said lighting portion.

14. The flashlight assembly of claim 13, further including a removable battery cover means on said first side.

15. A combination flashlight assembly and an ashtray holder in a vehicle comprising:

an ashtray opening having a substantially rectangular open front formed in the interior of said vehicle;

a flashlight having an elongated housing with a front holding portion and a first substantially rectangular end having a lighting means therein;

said lighting means including a bulb, a lens and a reflector, operated by a switch means;

means for releasably capturing said first substantially rectangular end having said lighting means therein in the substantially rectangular open front of said ashtray opening; and means for charging said flashlight when inserted completely into said ashtray opening.

16. The flashlight assembly of claim 15 wherein said elongated housing is substantially rectangular in shape for slidable insertion into a further substantially rectangular portion of said ashtray opening.

17. The flashlight assembly of claim 16, further including a rail means mounted to said elongated housing to enable said elongated housing to be inserted and guided into the proper position in said substantially rectangular ashtray opening.

18. The flashlight assembly of claim 17 wherein said elongated body includes a reduced neck portion connecting the elongated body to said front holding portion.

19. The flashlight assembly of claim 15 wherein said elongated housing is substantially V-shaped for insertion into said substantially rectangular open front of said ashtray opening for pivotable movement into said ashtray opening.

20. A combination flashlight assembly and an ashtray holder in a vehicle comprising:

an ashtray opening having a substantially rectangular open front formed in the interior of said vehicle;

a flashlight having an elongated housing with a first end and a second end, a front holding portion at said second end, and said first end being substantially rectangular with a lighting means therein;

said front holding portion at said second end being substantially rectangular and covered in a material which matches the interior of said vehicle;

said lighting means including a bulb, a lens and a reflector, and operated by a switch means connected to a power source; and means for releasably capturing said first substantially rectangular end having said lighting means therein in said substantially rectangular open front of said ashtray opening whereby said flashlight may be completely inserted into said ashtray opening whereby said front holding portion at said second end will blend with said interior of said vehicle.

* * * * *